United States Patent
McKittrick et al.

(10) Patent No.: US 11,335,258 B2
(45) Date of Patent: May 17, 2022

(54) INFORMATION HANDLING SYSTEM THIN DISPLAY WITH MINIMAL BEZEL

(71) Applicant: Dell Products L.P., Round Rock, TX (US)

(72) Inventors: Allen B. McKittrick, Cedar Park, TX (US); Deeder M. Aurongzeb, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/861,386

(22) Filed: Apr. 29, 2020

(65) Prior Publication Data

US 2021/0343236 A1    Nov. 4, 2021

(51) Int. Cl.
*G09G 3/3233* (2016.01)
*G09G 3/3258* (2016.01)

(52) U.S. Cl.
CPC ......... *G09G 3/3233* (2013.01); *G09G 3/3258* (2013.01); *G09G 2300/0469* (2013.01); *G09G 2380/02* (2013.01)

(58) Field of Classification Search
CPC ............... G09G 3/3233; G09G 3/3258; G09G 2300/0469; G09G 2380/02
See application file for complete search history.

(56) References Cited

U.S. PATENT DOCUMENTS

| | | | |
|---|---|---|---|
| 8,436,958 B2 | 5/2013 | Lee | |
| 8,780,579 B2 | 7/2014 | Kwon et al. | |
| 9,559,156 B2 | 1/2017 | Kim | |
| 2009/0207560 A1* | 8/2009 | Lee | H01L 51/5243 361/679.01 |
| 2012/0170244 A1* | 7/2012 | Kwon | G06F 1/1637 361/829 |
| 2014/0132488 A1* | 5/2014 | Kim | G06F 1/1637 345/76 |
| 2015/0145756 A1* | 5/2015 | Kim | H01L 27/329 345/76 |
| 2016/0266672 A1* | 9/2016 | Inagaki | H01L 27/3297 |
| 2017/0098794 A1* | 4/2017 | Cho | H01L 51/0097 |
| 2018/0294328 A1* | 10/2018 | Kanaya | H01L 51/0097 |

FOREIGN PATENT DOCUMENTS

KR    101615791 B1    4/2016

* cited by examiner

*Primary Examiner* — Jeff Piziali
(74) *Attorney, Agent, or Firm* — Zagorin Cave LLP; Robert W. Holland

(57) ABSTRACT

A zero bezel display formed from an organic light emitting diode film defines a viewing perimeter within an outer perimeter and supports control lines between the viewing perimeter and outer perimeter. A relief cut from each corner of the display film allows each side of the display film to fold to the rear of the display so that the viewing perimeter defines the viewable edge of the display.

16 Claims, 5 Drawing Sheets

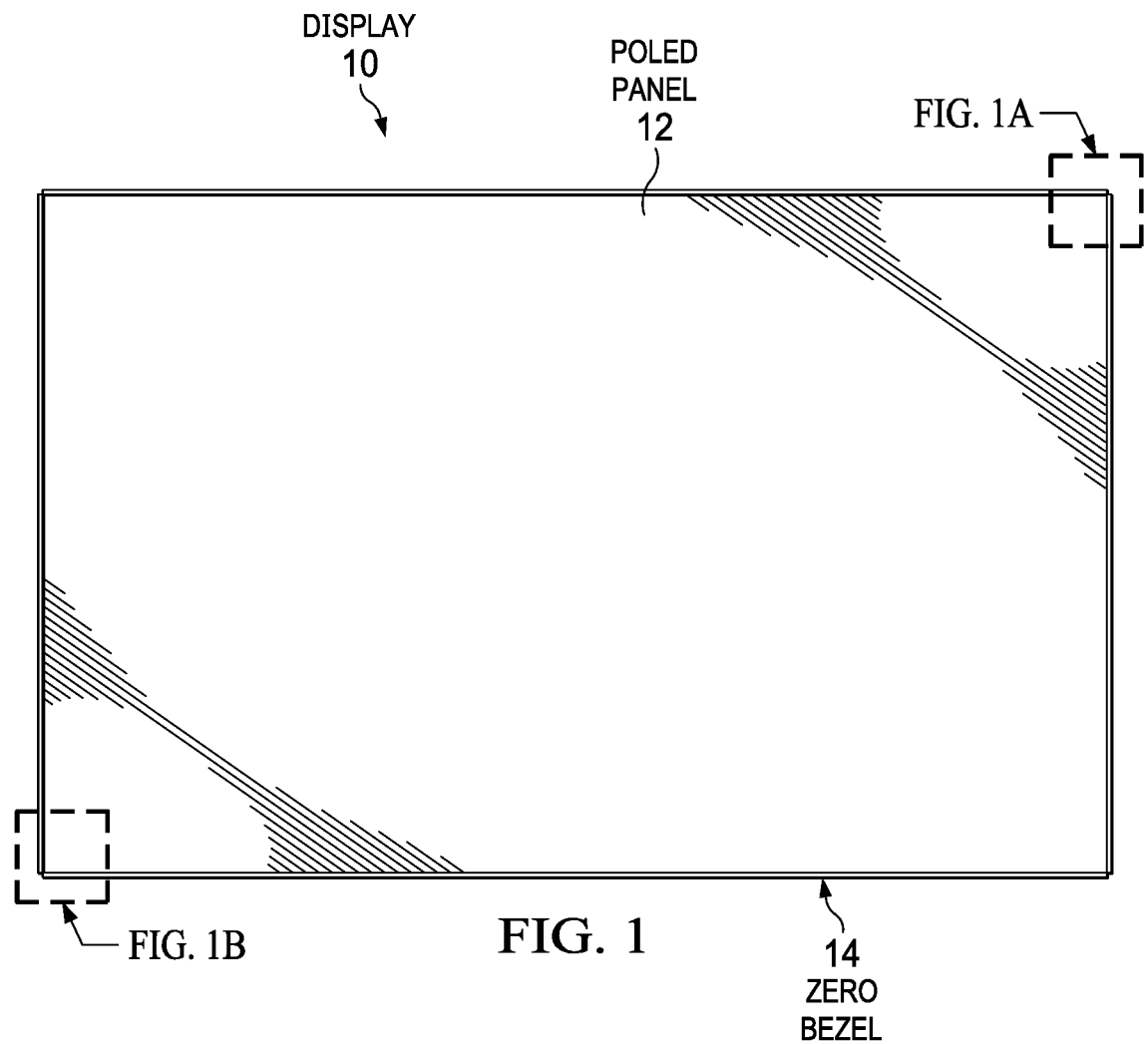
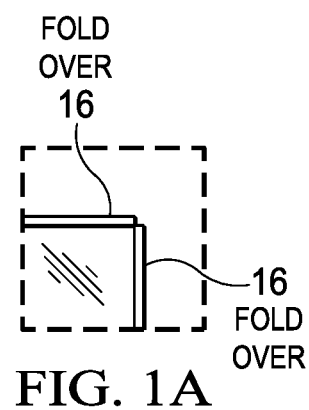
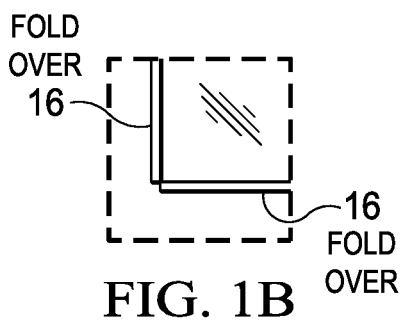

INFORMATION HANDLING SYSTEM THIN DISPLAY WITH MINIMAL BEZEL

BACKGROUND OF THE INVENTION

Field of the Invention

The present invention relates in general to the field of portable information handling systems, and more particularly to a portable information handling system thin display with minimal bezel.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems integrate processing components, a display and a power source in a portable housing to support mobile operations. Portable information handling systems allow end users to carry a system between meetings, during travel, and between home and office locations so that an end user has access to processing capabilities while mobile. Tablet configurations typically expose a touchscreen display on a planar housing that both outputs information as visual images and accepts inputs as touches. Convertible configurations typically include multiple separate housing portions that couple to each other so that the system converts between closed and open positions. For example, a main housing portion integrates processing components and a keyboard and rotationally couples with hinges to a lid housing portion that integrates a display. In a clamshell configuration, the lid housing portion rotates approximately ninety degrees to a raised position above the main housing portion so that an end user can type inputs while viewing the display. After usage, convertible information handling systems rotate the lid housing portion over the main housing portion to protect the keyboard and display, thus reducing the system footprint for improved storage and mobility.

Generally, for a defined set of processing capabilities, end users prefer portable information handling systems having a minimal size and weight. Typically, an end user selects an information handling system based upon a display size, which defines the housing width and length. Once a display size is established, housing Z-height or thickness is typically driven by thermal and power characteristics of processing components disposed in the housing. Although the display generally defines the width and length, the actual system width and length is driven in part by the type of housing that holds the display. In particular, the display typically has an outer perimeter that is protected by a bezel coupled to the housing. The bezel size adds to height and weight and also tends to create a visual impression regarding the dimensions of the information handling system. As a result, information handling system manufacturers generally attempt to minimize bezel size, although some outer perimeter bezel is typically included to support power and communication of pixel values between the display and information handling system from interconnects and wirelines located on the perimeter of the display. Display selection can also impact system thickness, also known as Z-height. For instance, liquid crystal display (LCD) panels generally present visual images with pixels that filter backlight to create colors. LCD panel thickness thus includes a backlight structure that distributes illumination across the panel. In contrast, organic light emitting diode (OLED) display panels generally present visual images with pixels that directly generate light by applying current to an organic material. OLED display panels tend to have reduced thickness compared with LCD panels due to the reduced structure size through elimination of the backlight.

SUMMARY OF THE INVENTION

Therefore, a need has arisen for a system and method which reduces display panel footprint.

In accordance with the present invention, a system and method are provided which substantially reduce the disadvantages and problems associated with previous methods and systems reducing display panel footprint. A display film has relief portions at each corner that define a bendable region at each side of the display to define a viewing perimeter of the display film as the outer edge of the display.

More specifically, a display presents visual images at a display surface of an organic light emitting diode display film having a viewing perimeter. Display visual information is communicated to pixels within the viewing perimeter by control lines disposed in the display film between the viewing perimeter and outer perimeter. A relief is cut in each corner of the outer perimeter so that each side of the display film has a bendable portion that folds individually to a position at the rear of the display film. Folding the display film along the viewing perimeter defines a display front surface with a zero bezel edge having viewable images to the fold location. In one embodiment, a plastic organic light emitting diode film is used having a plastic substrate at the display interior out to the viewing perimeter without extending to the control wire region that folds to the rear of the display film.

The present invention provides a number of important technical advantages. One example of an important technical advantage is that an OLED display panel has a reduced footprint that supports a zero bezel implementation. Relief cuts in the display film support clean folding arrangements that minimize display panel dimensions, including length, width and height. Length and width dimensions are reduced with control and power wirelines folded behind the display along each side of the panel so that a bezel structure for protection of the display edge is minimized and even eliminated. Display panel thickness is reduced by avoiding folding irregularities at panel corners. In one example embodiment, 90 degree folds that run along a housing side can help to reduce display panel thickness by avoiding display film material folded under the display panel.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIGS. 1, 1A and 1B depict a front view of an example embodiment of a zero-bezel display;

DETAILED DESCRIPTION

Figure 2:
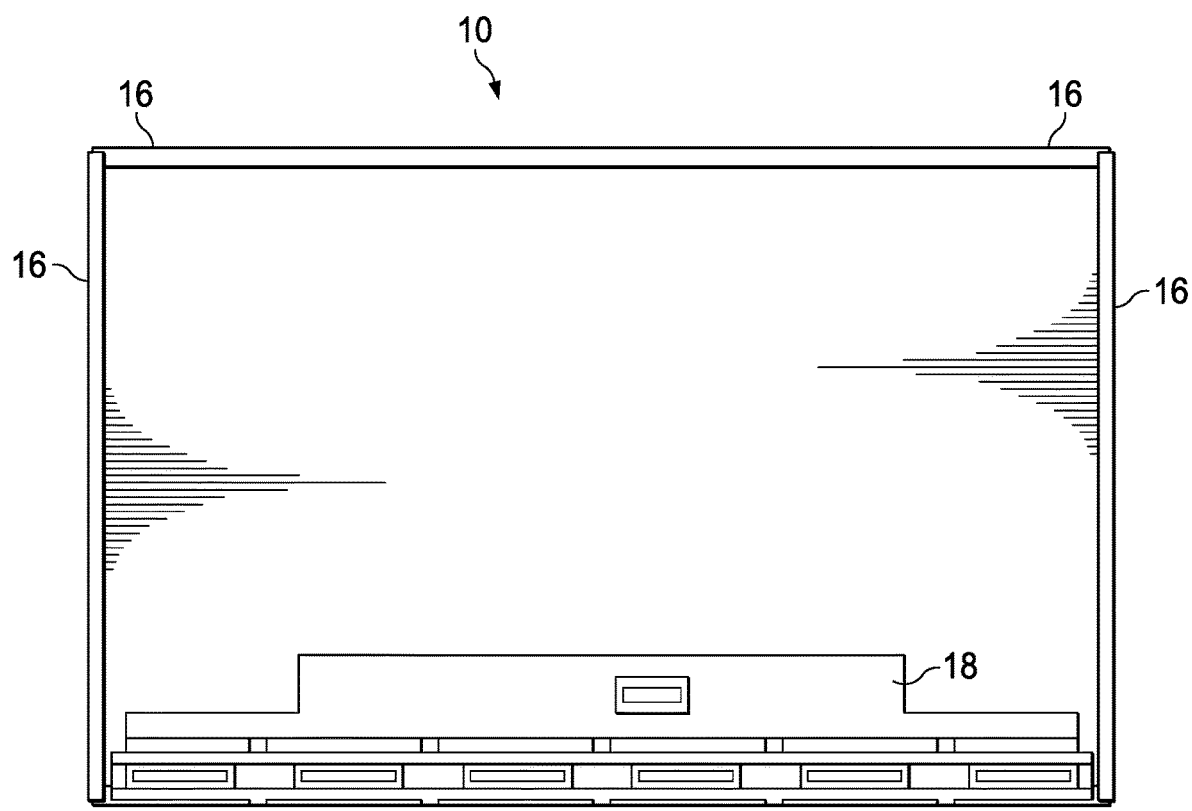
FIG. 2 depicts a rear view of an example embodiment of a zero bezel display.

A display film presents visual images provided from an information handling system within a viewing perimeter defined by relief regions cut at corners of the display film between the viewing perimeter and outer perimeter of the display film. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring now to FIGS. 1, 1A and 1B, a front view depicts an example embodiment of a zero-bezel display. In the example embodiment, display 10 presents visual information within a viewing perimeter defined by an array of pixels of a plastic organic light emitting diode (POLED) display panel 12. POLED display panel 12 presents visual images based upon pixel values communicated to pixels through control wires that define colors generated with current applied to organic material in the pixels. POLED display panel 12 is an organic light emitting diode (OLED) display film having a plastic substrate at a rear side that provides flexibility for bending and folding. In an alternative embodiment, a POLED display panel 12 or other type of flexible display film, such as a liquid crystal display (LCD) film, may be used.

In the example embodiment, the viewing perimeter of display panel 12 is defined by a zero-bezel boundary 14 at folds made in the film as described in greater detail below. As illustrated by FIGS. 1A and 1B, folds are provided at each corner of display panel 12 to define the zero bezel 14 by a fold over region 16 based upon the material characteristics of POLED display panel 12. Once the fold is established, POLED panel 12 may have the viewing perimeter defined by zero bezel 14 fixed with a glass cover, such as may include capacitive touch detection. In the example embodiment, the zero bezel may have a small area just outside of the viewing perimeter where the fold radius of the display film material is present, such as 0.2 mm. In an alternative embodiment, a side bezel may couple to the zero bezel 14 to protect the side of display 10 from damage, such as a plastic bezel that protects against chipping of cover glass.

Referring now to FIG. 2, a rear view depicts an example embodiment of a zero bezel display 10. In the example embodiment, fold over region 16 extends around the rear side of display 10 perimeter along with a control board 18. The rear side of display 10 will have a cover once installed in an information handling system housing or peripheral display housing that protects the display timing controller and other logical components. Fold over regions 16 can extend in towards the middle of rear side of display 10 as needed to communicate control signals.

Figure 3:
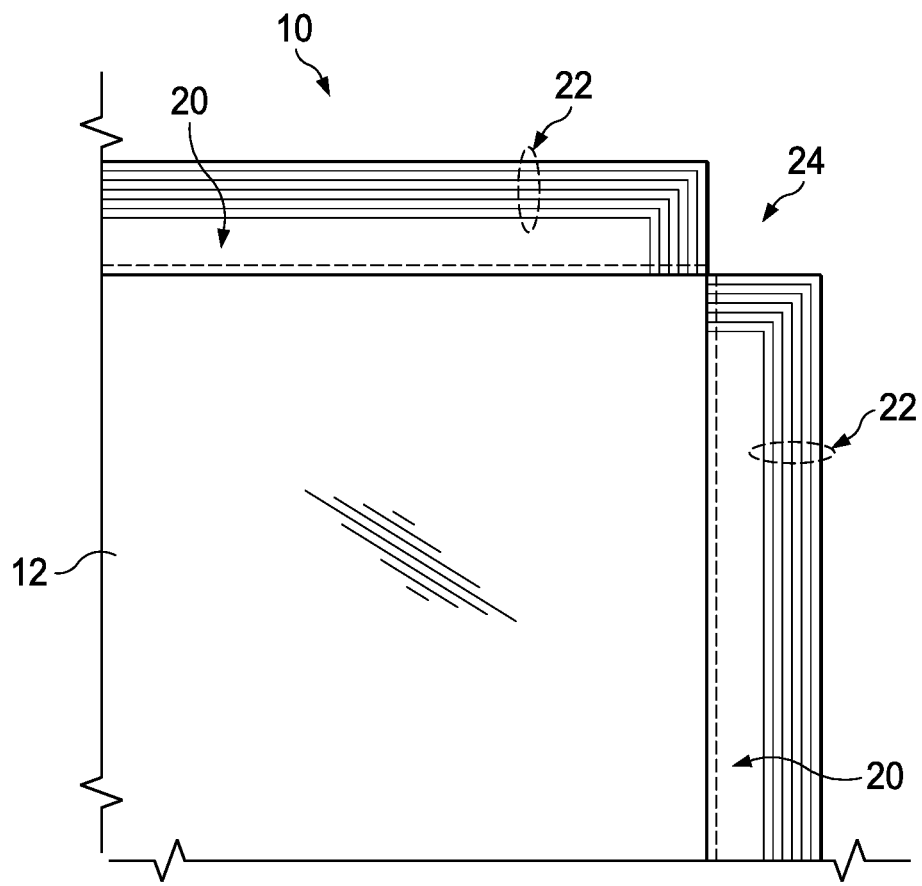
FIG. 3 depicts a front view of a display film configured with a relief area to define folds for a viewing perimeter.

Referring now to FIG. 3, a front view depicts a POLED display panel 12 configured with a relief area 24 to define folds for a viewing perimeter. In the example embodiment, a bend region 20 defines the boundary of the viewing perimeter as shown by the dotted line and provides separation between the viewing perimeter and a control wire region 22 that integrates control wires for communication of pixel values to pixels within the viewing perimeter. The relief region 24 may be formed as part of the POLED film manufacture process or cut from the film at assembly of display 10. In the example embodiment, each relief region 24 has a square shape with a notch cut from the outer perimeter of control wire region 22 to the viewing perimeter so that the display film folds along each side of POLED display panel 12 as a separate portion that avoids compression of the display film at the corners. In alternative embodiments, relief region 24 may have in full or in part a radial shape, such as an arc, semicircle or other curved shape combined with a rectangular shape, each of which alternatives can provide sufficient folding bend radius while improving material reliability and, in some instances, providing space for wirelines to traverse the fold. In one example embodiment, a POLED display film having a plastic substrate within the view perimeter is formed to lack a plastic substrate at bend region 20 to aid in folding the display film to the rear side of display 10. The plastic substrate may be absent at control wire region 22 or may be included to support the control wires so that bend region 20 without plastic substrate has plastic substrate along both its interior and exterior perimeter.

Figure 4:
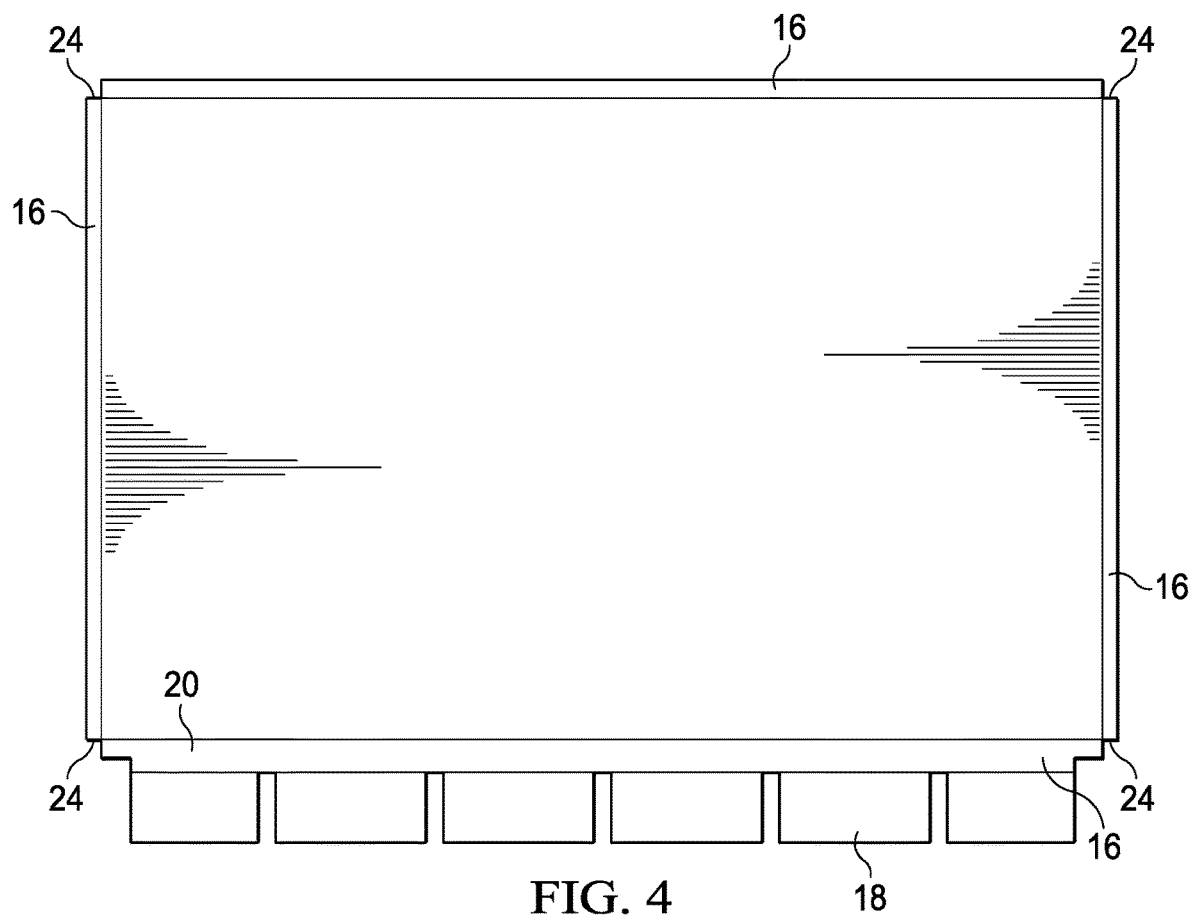
FIG. 4 depicts a rear view of a display film configured to fold a bendable region of the outer perimeter to define a zero bezel viewing perimeter.

Referring now to FIG. 4, a rear view depicts a POLED display panel 12 configured to fold a bend region 20 of the outer perimeter to define a zero bezel viewing perimeter. In the example embodiment, fold over region 16 is defined by the location of relief region 24 formed and/or cut at each corner of POLED display panel 12. Control board 18 extends out the bottom side of control wire region 22 to provide an interface with the control wires and communication of pixel values through the control wire region 22 to pixels within the viewing perimeter. In various alternative embodiments, control board 18 may interface at the bottom surface with a varied location of relief region 24 for routing of control wires along the side of display 10. The location of relief regions 24 at the bottom portion of POLED display panel 12 may adjust based upon the type of implementation, such as for an information handling system versus a peripheral display. For instance, a convertible information handling system may have a hinge area at the bottom portion that provides additional space for routing of wirelines whereas a peripheral display may seek to obtain a zero bezel appearance at the bottom portion where the peripheral display is supported by a stand over top of a desktop.

Figure 5:
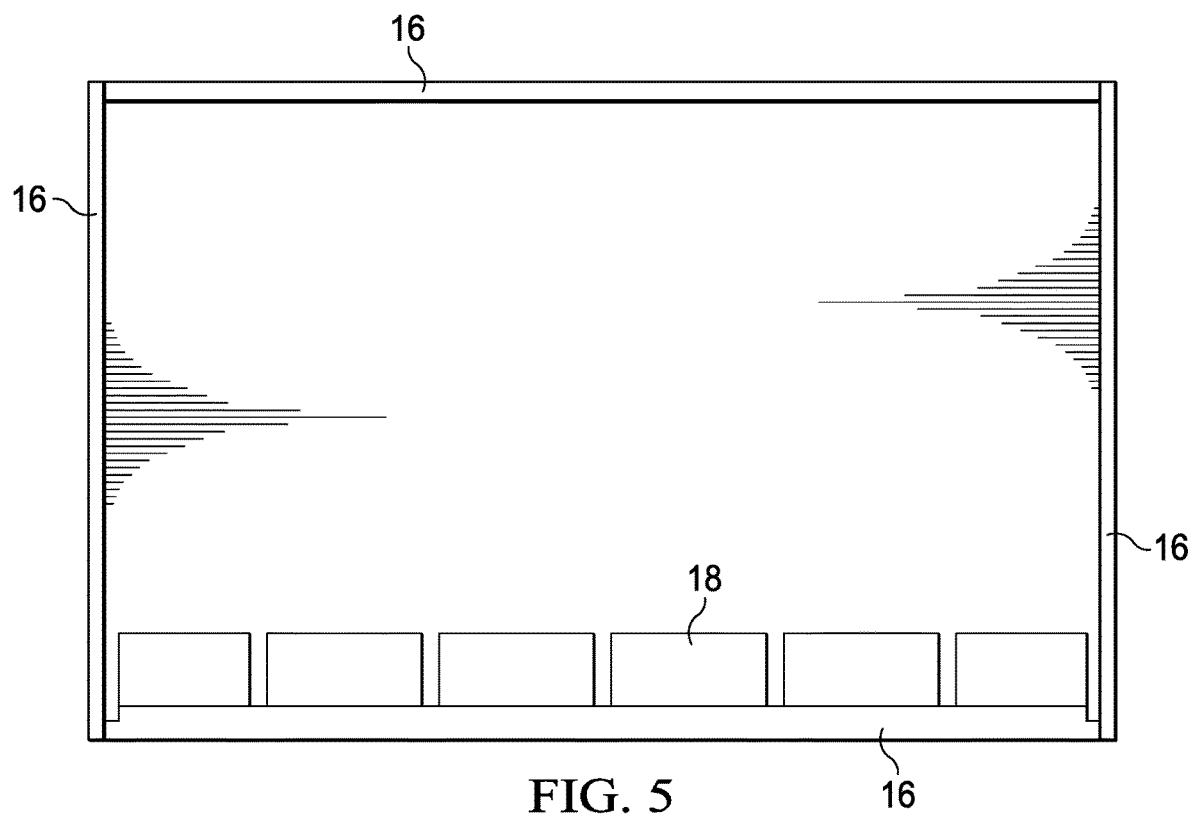
FIGS. 5, 5A and 5B depict a rear view of a display film having a bendable region folded to define a zero bezel viewing perimeter.
Figure 5A:
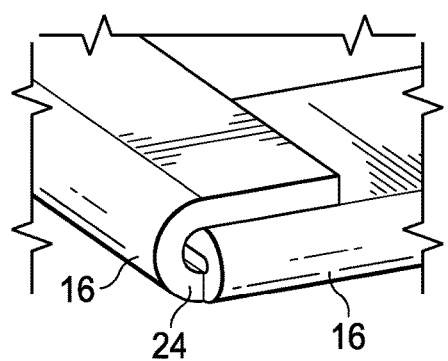
Figure 5B:
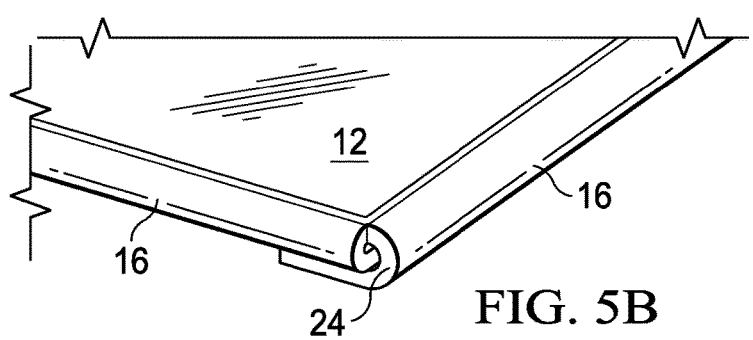

Referring now to FIGS. 5, 5A and 5B, a rear view depicts a POLED display panel 12 having a fold over region 16 folded to define a zero bezel viewing perimeter. In the example embodiment, the zero bezel fold is performed in turn at each of opposing sides to overlap the display film material where the folds intersect at the corner relief regions. In the example embodiment, the side fold over regions are each folded first 180 degrees to rest against the rear surface of display 10. Next, the top and bottom fold over regions are folded 180 degrees so that at the corners of display 10 the top and bottom fold regions fold over the side fold regions, as illustrated by FIGS. 5A and 5B. In the example embodiment, each separate foldable region as defined by the relief cuts folds a full 180 degrees to rest against the rear side of display 10. In an alternative embodiment, a fold angle of 90 degrees may be used instead with the folded portion coupled by adhesive or other attachment techniques to a supportive housing at the rear of display 10. Although a 90 degree fold can result in a slightly thicker display structure, the reduced bend angle may have advantageous implications for the durability of the OLED film. Although the example embodiment depicts opposing sides folded to the rear before opposing top and bottom, alternative embodiments may fold the top and bottom over first followed by the opposing sides. Alternatively, each side may be folded in a circular pattern around the perimeter.

Although the present invention has been described in detail, it should be understood that various changes, substitutions and alterations can be made hereto without departing from the spirit and scope of the invention as defined by the appended claims.

What is claimed is:

1. A display comprising:
    a display surface operable to present visual images within a viewing perimeter; and
    a control wire region disposed in the display surface outside the viewing perimeter and having relief cuts at each corner of the display surface;
    wherein the control wire region folds at the viewing perimeter towards a rear side of the display surface; and
    wherein the display surface comprises an organic light emitting diode display film having a plastic substrate only within the viewing perimeter and not in the control wire region.

2. The display of claim 1 wherein each of the relief cuts have a square shape.

3. The display of claim 1 wherein the control wire region folds 90 degrees to define the viewing perimeter.

4. The display of claim 1 wherein the control wire region folds 180 degrees to define the viewing perimeter.

5. The display of claim 1 wherein the control wire region has plural control wires separated from the viewing perimeter by a bend region.

6. The display of claim 1 wherein the viewing perimeter has a rectangle shape having first and second opposing sides, the control wire region folded at the first opposing sides and then the second opposing sides so that the second opposing sides overlap the first opposing sides at the relief cuts.

7. A method for manufacture of a display, the method comprising:
    forming a display film having a display surface operable to present visual images within a viewing perimeter and having control wires in a control wire region outside of the viewing perimeter, each corner of the control wire region having a relief, a plastic substrate disposed under the display film within the viewing perimeter and not in the control wire region; and
    folding the control wire region on each side of the viewing perimeter towards a rear side of the display surface.

8. The method of claim 7 wherein the forming the display film further comprises cutting the relief as a rectangle from each corner of the display film.

9. The method of claim 7 wherein the forming the display film further comprises forming an organic light emitting diode display film.

10. The method of claim 7 wherein the folding further comprises folding the control wire region 90 degrees to define the viewing perimeter.

11. The method of claim 7 wherein the folding further comprises folding the control wire region 180 degrees to define the viewing perimeter.

12. The method of claim 7 wherein the folding further comprises:
    folding the control wire region of first and second opposing sides of the viewing perimeter to the rear side of the display surface; and
    folding the control wire region of third and fourth opposing sides of the viewing perimeter to the rear side of the display surface to overlap the first and second opposing sides.

13. A method for manufacture of a display, the method comprising:
    forming an organic light emitting diode film having a rectangular shape and a viewing perimeter within an outer perimeter, the viewing perimeter having a plastic substrate;
    including control wires in a control wire region outside of the viewing perimeter, the control wire region lacking the plastic substrate;
    cutting out a relief in each corner of the rectangular shape, the relief having a relief shape between the viewing perimeter and outer perimeter; and
    folding the control wire region at least 90 degrees towards a rear side of the organic light emitting diode film to define the viewing perimeter as the edge of the organic light emitting diode film visible at the front of the display.

14. The method of claim 13 wherein the folding comprises folding the control wire region 180 degrees to abut against the rear side and the relief shape comprises a radial shape.

15. The method of claim 14 wherein:
    the relief shape comprises a rectangular shape.

16. The method of claim 15 further comprising defining a bend region between the viewing perimeter and control wires.

* * * * *